(12) United States Patent
Handte et al.

(10) Patent No.: US 11,433,344 B2
(45) Date of Patent: Sep. 6, 2022

(54) DIVIDED FLOW GUIDING DEVICE, KIT COMPRISING BASE BODY AND END PIECE OF A FLOW GUIDING DEVICE, FILTER UNIT AND METHOD FOR CLEANING

(71) Applicant: Camfil APC GmbH, Tuttlingen (DE)

(72) Inventors: Jakob Handte, Tuttlingen (DE); Dominick Bisogni, Tuttlingen (DE); Randilyne Huckaby, Tuttlingen (DE); Ryan Listenbee, Tuttlingen (DE); Adam Simino, Tuttlingen (DE); Alex Wells, Tuttlingen (DE); Daniel Vangilder, Tuttlingen (DE)

(73) Assignee: CAMFIL APC GMBH, Tuttlingen (DE)

( * ) Notice: Subject to any disclaimer, the term of this patent is extended or adjusted under 35 U.S.C. 154(b) by 255 days.

(21) Appl. No.: 16/273,207

(22) Filed: Feb. 12, 2019

(65) Prior Publication Data
US 2019/0247778 A1    Aug. 15, 2019

(30) Foreign Application Priority Data
Feb. 13, 2018    (DE) ............. 10 2018 103 157.2

(51) Int. Cl.
*B01D 46/24*    (2006.01)
*B01D 46/52*    (2006.01)
(Continued)

(52) U.S. Cl.
CPC ...... *B01D 46/2411* (2013.01); *B01D 46/0043* (2013.01); *B01D 46/2403* (2013.01);
(Continued)

(58) Field of Classification Search
CPC .............. B01D 46/2411; B01D 46/002; B01D 46/0021; B01D 46/0043; B01D 46/0068;
(Continued)

(56) References Cited

U.S. PATENT DOCUMENTS 3,594,992 A * 7/1971 Carr .............. B01D 46/71
                                            55/368
5,152,890 A * 10/1992 Linnersten ......... B01D 46/2411
                                            55/498
(Continued)

FOREIGN PATENT DOCUMENTS

CN    101848753 A    9/2010
CN    202962173 U    6/2013
(Continued)

OTHER PUBLICATIONS

Search Report, DE 10 2018 1031572, dated Sep. 10, 2018 (in German) (7 pp.).
(Continued)

*Primary Examiner* — Robert A Hopkins
*Assistant Examiner* — Qianping He
(74) *Attorney, Agent, or Firm* — Eversheds Sutherland (US) LLP

(57) ABSTRACT

The present application relates to a filter cartridge for removing impurities from a dirty gas flow to be filtered, including a cylindrical filter element made from filter material, a filter insert inserted in the filter element, an inner space formed between the filter element and the filter insert, with the filter material being designed for being cleaned when a compressed air flow is applied against a flow direction of the dirty gas flow, and a base body of a flow guiding device having a surface designed for guiding the compressed air flow, wherein the base body has a distal end zone which is prepared for being completed by an end piece separate from the filter cartridge and mountable to an external housing for flow guiding the compressed air flow. Further, the present application relates to a kit, a filter unit, and a method for cleaning the filter cartridge.

7 Claims, 4 Drawing Sheets

(51) Int. Cl.
  *B01D 46/00* (2022.01)
  *B01D 46/58* (2022.01)
  *B01D 46/60* (2022.01)
  *B01D 46/71* (2022.01)

(52) U.S. Cl.
  CPC .......... *B01D 46/52* (2013.01); *B01D 46/522* (2013.01); *B01D 46/58* (2022.01); *B01D 46/60* (2022.01); *B01D 46/71* (2022.01); *B01D 46/0005* (2013.01); *B01D 46/521* (2013.01); *B01D 2265/06* (2013.01); *B01D 2275/201* (2013.01)

(58) Field of Classification Search
  CPC .. B01D 46/2403; B01D 46/52; B01D 46/522; B01D 46/0005; B01D 46/521; B01D 2265/06; B01D 2275/201; B01D 46/0067–0076; B01D 46/0024
  USPC .................. 55/498, 282–305, 361–382, 331
  See application file for complete search history.

(56) References Cited

U.S. PATENT DOCUMENTS

| | | | | |
|---|---|---|---|---|
| 5,972,059 | A | * | 10/1999 | Morgan ............... B01D 46/002 55/336 |
| 6,099,726 | A | * | 8/2000 | Gembolis .............. B01D 29/21 210/243 |
| 8,231,715 | B2 | | 7/2012 | Gross et al. |
| 2002/0152732 | A1 | * | 10/2002 | Kallsen ................. B01D 46/71 55/368 |
| 2004/0026137 | A1 | | 12/2004 | Morgan et al. |
| 2015/0182897 | A1 | | 7/2015 | Ji et al. |

FOREIGN PATENT DOCUMENTS

| | | | | |
|---|---|---|---|---|
| CN | 202983425 | U | 6/2013 | |
| CN | 105396392 | A | 3/2016 | |
| CN | 205287916 | U * | 6/2016 | ........... B01D 46/429 |
| CN | 205287916 | U | 6/2016 | |
| DE | 42 42 991 | A1 | 6/1994 | |
| DE | 696 02 268 | T2 | 8/1999 | |
| JP | 61093816 | | 5/1986 | |
| JP | S6193816 | A | 5/1986 | |
| KR | 2013 0097956 | A | 9/2013 | |
| WO | 9928012 | A1 | 6/1999 | |
| WO | 2008116455 | A1 | 10/2008 | |
| WO | 9834713 | A1 | 8/2018 | |
| WO | 2019158529 | A1 | 8/2019 | |

OTHER PUBLICATIONS

Search Report, DE 10 2018 1031572, dated Sep. 10, 2018 (in English) (6 pp.).
Search Report, EP 19156728.8-1104, dated May 20, 2019 (in German) (8 pp.).
Search Report, EP 19156728.8-1104, dated May 20, 2019 (in English) (3 pp.).
International Search Report and Written Opinion for PCT/EP2019/053443, dated May 20, 2019 (7 pp.).
CN Office Action for CN201980012109X, dated Sep. 1, 2021 (in Chinese) (6 pp.).
CN Office Action for CN201980012109X, dated Sep. 1, 2021 (in English) (8 pp.).

* cited by examiner

DIVIDED FLOW GUIDING DEVICE, KIT COMPRISING BASE BODY AND END PIECE OF A FLOW GUIDING DEVICE, FILTER UNIT AND METHOD FOR CLEANING

TECHNICAL FIELD

The invention relates to a filter cartridge for removing impurities, e.g. dust, from a dirty gas flow to be filtered, comprising a cylindrical filter element, for example made from filter material or from air-impermeable material, in which a filter insert made from filter material is inserted, with an e.g. annular inner space being formed between the filter element and the filter insert, wherein the filter material is designed for being cleaned when a compressed air flow is applied against a flow direction of the dirty gas flow, with a base body of a flow guiding device having a surface designed for guiding the compressed air flow being provided. Furthermore, the invention relates to a kit comprising an end piece and a filter cartridge for removing impurities from a dirty gas flow to be filtered. The invention further relates to a filter unit for removing impurities from a dirty gas flow to be filtered, comprising a housing in which at least one said filter cartridge is disposed and comprising an end piece which is fixed to the housing, wherein an axial end face of the end piece is disposed to face a first axial end face of the base body of the filter cartridge. Moreover, the invention relates to a method for cleaning said filter cartridge, preferably within said filter unit, wherein a compressed air flow is ejected from a nozzle of a compressed air tank of the filter unit, then flows against the flow guiding device including the base body and the end piece and is widened by the external shape of the flow guiding device such that it covers at least 80% of the filter material of the filter element.

BACKGROUND OF THE INVENTION

From prior art, filter cartridges are known already. For example, U.S. Pat. No. 5,972,059 discloses an air filter arrangement comprising a cylindrical air filter element, comprising a base element having an opening formed therein, comprising an upper element having an opening formed therein, with the opening of the upper element being arranged opposite to the one end of the cylindrical air filter element, with the opening of the base element being arranged opposite to the one end of the cylindrical air filter element, with the opening of the base element being arranged opposite to the other end of the cylindrical air filter element, comprising an elongated conical filter element having a head portion, with the outer wall in the longitudinal direction of the conical filter element extending opposite to the major part of the inner wall in the longitudinal direction of the cylindrical filter element, with the opening of the base element being arranged opposite to the base portion of the conical filter element, and comprising means for securing the head portion of the conical filter element to the inner wall of the cylindrical filter element, with air to be filtered being guided into the inner area of the conical filter element through the base portion thereof, wherein the air flows through the walls of the conical filter element into the space between the outer wall of the conical filter element and the inner wall of the conical filter element, wherein the air to be cleaned further flows through the walls of the cylindrical filter element into the space between the outer wall of the conical filter element and the inner wall of the cylindrical filter element, and wherein the air in the space is clean air flowing out through the opening in the upper element. Hence, a filter cartridge is disclosed in which the air to be cleaned is guided both through the outer wall of the cylindrical element inwardly and through the inner wall of the conical filter element outwardly into the inner space between the conical filter element and the cylindrical filter element and is cleaned in this way.

Prior art always suffers from the drawback that a filter cartridge has to be regularly replaced and therefore a new flow guiding device has to be produced for each replacement filter cartridge, even if said flow guiding device has a longer service life than the filter material of the filter cartridge and thus would not yet have to be replaced. In addition, there are filter cartridges in which the flow guiding device protrudes in the axial direction from the filter cartridge. This impedes and, resp., prevents replacement of the filter cartridge, as a filter unit housing in which the filter cartridge is disposed usually has an as compact design as possible so that projecting parts of a filter cartridge require a larger aperture within the housing for replacing the filter cartridge.

Hence, it is the object of the invention to avoid or at least reduce the drawbacks from prior art. Especially, it is intended to develop a filter cartridge which can be manufactured at low cost, is versatile and permits to be used in a housing of compact design.

According to the invention, the object of the invention is achieved in a generic device by the fact that the base body has a distal end zone which is prepared to be completed by an end piece separate from the filter cartridge and adapted to be mounted on an external housing for flow-guiding the compressed air flow.

In other words, the invention relates to a filter cartridge for removing impurities from a dirty gas flow to be filtered, comprising a cylindrical filter element made from filter material in which a filter insert is inserted, wherein an inner space is formed between the filter element and the filter insert, with the filter material being designed for being cleaned when a compressed air flow is applied against a flow direction of the dirty gas flow, wherein there is provided a flow guiding device portion which is completed by another flow guiding device portion which is no part of the filter cartridge for guiding the flow. This means that the flow guiding device portion of the filter cartridge is incomplete. Also, this means that the flow guiding device portion of the filter cartridge is configured and arranged so that it guides the compressed air flow (only) by interaction with the other flow guiding device portion, i.e. fulfils the function to guide the compressed air flow.

The base body is the flow guiding device portion which is fastened to the filter cartridge; thus, it is part of the filter cartridge. The end piece is the other flow guiding device portion which is not secured to the filter cartridge but to an external housing. The base body and the end piece jointly fulfil the function of the flow guiding device for guiding the compressed air flow.

This offers the advantage that the split design of the flow guiding device enables a filter cartridge to be replaced, with one part (viz. the end piece) being retained in the housing. In this way, the filter cartridge may be withdrawn for example in the horizontal direction (e.g. via retaining rails), as a part of the flow guiding device projecting from the filter cartridge, i.e. the end piece, is retained in the housing and the filter cartridge thus ends/terminates flush with an axial end of the filter element. Moreover, it is advantageously possible that only the base body of the flow guiding device has to be replaced and that the end piece can be reused, which has a favorable effect on the manufacturing cost of the (replacement) filter cartridge and facilitates exchange of the filter cartridge.

Advantageous embodiments shall be claimed in the subclaims and shall hereinafter be illustrated in detail.

In addition, it is useful when the surface of the base body, especially a radial outer surface, is formed and disposed so that it is transformed smoothly and/or infinitely and/or in conformity with the slope and/or in conformity with the curvature into an outer surface, especially a radial outer surface, of the end piece. In conformity with the slope means in this context that the slope of the surface of the base body and the slope of the outer surface of the end piece are identical at the point of transition (of the (outer) surfaces). In conformity with the curvature in this context means that the curvature of the surface of the base body and the curvature of the outer surface of the end piece are identical at the point of transition (of the (outer) surfaces). This enables the flow of the compressed air flow to be guided along the surfaces with minimum loss of energy.

It is moreover advantageous when the transition of the surface of the base body to the outer surface of the end piece is such that the flow of the compressed air flow during purification is adjacent to a total surface area of the base body and of the end piece in order to reach, in the event of cleaning, at least 80%, preferably more than 90%, further preferred more than 95%, especially preferred 100%, of the filter material of the filter element. Thus, the base body and the end piece are adjacent so that the surfaces thereof form a total surface area along which the flow of the compressed air flow is guided and is thus widened so that the flow covers the filter material.

It is further preferred when (only) the base body, viz. only a portion or a part of the flow guiding device, is secured to the filter material, e.g. to the filter insert. Conversely, this means that at least one part of the flow guiding device, viz. the end piece, is not secured to the filter material and/or to the filter cartridge. This helps to reduce the components to be replaced when a filter cartridge is exchanged.

Another function which is fulfilled by the flow guiding device is grounding the filter cartridge to the housing. This is necessary and relevant in terms of safety especially with explosive dusts when antistatic filter material is used. To this end, the filter material is connected to be electrically conducting to the cap half at the filter cartridge, i.e. to the base body. The housing is connected to be electrically conducting to the cap apex/end piece located within the filter housing. When mounting the filter cartridge, an electric contact is made between the two cap pieces, viz. between the base body and the end piece, for example via a spring or positive fit and the electric voltage can flow out from the filter cartridge into the housing.

Via the same mechanism, it can be safeguarded, when mounting the filter cartridge and joining the cap pieces, by closing the electric circuit that only the cartridges which are correct for the case of use are inserted.

As an alternative, also via RFID technology which is incorporated in the end piece and the base body of the flow guiding device as transmitter and receiver it can be achieved that in the event of wrong assembly the system is blocked.

Via the flow guiding device the grounding of the filter cartridge can be executed by an electric contact at the disconnection point.

It is of further advantage when electrically conductive elements within the base body (and at the end piece) for grounding are provided which are designed such that grounding of the filter cartridge vis-à-vis the housing is executed. Especially, it is of advantage when the electrically conducting elements are in the form of resilient contact electrodes. It is possible as an alternative to provide form fit elements such as plugs or a profiling in the contact face with the end piece.

It is moreover useful when the base body includes a receiver or a transmitter having RFID technology for checking a mating filter cartridge and/or for checking positioning of the filter cartridge. This helps to easily check whether a mating filter cartridge has been inserted in the filter unit and/or whether the filter cartridge is correctly positioned. The receiver or transmitter of the base body is designed for communicating with a corresponding transmitter or receiver within the end piece. Alternatively, checking may also be performed by closing an electric circuit and/or by mechanical form fit when the base body is pressed against the end piece and, resp., when the filter cartridge is pressed against the filter housing.

According to a preferred embodiment the filter insert can be align centered to the filter element during the assembly. The filter cartridge is pressed against a centering device comprising a first centering portion for aligning the filter element centered to the centering device and a second centering portion for aligning the filter insert centered to the centering device. It is useful when the end piece is coaxially arranged to the centering device. It is useful when the end piece is fixed to the centering device. The first centering portion can be formed as a protruding projection in an axial direction. The first centering portion protrudes in the first axial direction. The first centering portion comprises a conical radial outer circumferential surface. The first centering portion tapers radially inwards in the first axial direction. The second centering portion can be formed as a protruding projection in an axial direction. The second centering portion protrudes in the first axial direction. The second centering portion comprises a conical radial outer circumferential surface. The second centering portion tapers radially inwards in the first axial direction. During assembly, when the filter cartridge is pressed against the centering device, a radial inner circumferential surface of the filter element is guided by the first centering portion to a position centered to the centering device, that is, a position centered to the end piece. During assembly, when the filter cartridge is pressed against the centering device, a radial inner circumferential surface of the filter insert is guided by the second centering portion to a position centered to the centering device, that is, a position centered to the end piece.

The split flow guiding device assumes, via the contact surface between the end piece and the base body, additional functions such as grounding of the filter element and, resp., of the filter cartridge vis-à-vis the filter housing, checking of the positioning of the filter cartridge within the housing, safeguarding and checking of the presence of the correct filter cartridge within the filter housing, for example mechanically, via RFID technology and/or electrically.

It is further advantageous when a peripheral edge of a first axial end face (at a first axial end) of the base body is located, preferably completely, in a plane in which an axial end face of the filter element is arranged. In this way, it is advantageously ensured that the filter cartridge terminates/ends flush with the axial end face of the filter element in the axial direction so that no components of the filter cartridge project from the filter element in the axial direction.

In addition, it is useful when the peripheral edge of the base body takes the shape of a circle. This helps to evenly widen the flow in the radial direction.

It is moreover advantageous when the base body is a cone frustum or a parabolic frustum. In this way, it can widen the flow of the compressed air flow impinging on the base body in the axial direction along its surface with especially little loss of energy.

Furthermore, it is beneficial when an outer diameter of the base body increases from the first axial end face of the base body to a second axial end face opposed to the first axial end face of the base body. In this way, a compressed air flow can advantageously be guided along the surface of the base body radially outwardly and thus can be widened.

It is especially preferred when the slope of the outer diameter of the base body decreases from the first axial end face to the second axial end face of the base body. In this way, the compressed air flow is achieved to be widened at first more strongly and with an increasing axial length is guided outwardly more smoothly, i.e. less strongly.

Moreover, it is favorable when the base body is hollow-walled or is in the form of a solid body. I.e. it is especially important in which way the surface of the base body is formed.

It is further useful when the first axial end face of the base body is plane or concave. i.e., that the base body does not protrude from the filter element in the axial direction but ends flush with the axial end face of the filter element or is inwardly bulged.

The object of the invention is also achieved by a kit comprising an end piece and a filter cartridge according to the invention for removing impurities from a dirty gas flow to be filtered, wherein the filter cartridge includes a cylindrical filter element made from filter material in which a filter insert made from filter material is inserted, with an inner space being formed between the filter element and the filter insert, wherein the filter material is designed for being cleaned when a compressed air flow is applied against a flow direction of the dirty gas flow, and includes a base body, the base body forming, in interaction with the end piece, a flow guiding device for guiding the compressed air flow.

Moreover, the object of the invention is also achieved by a filter unit for removing impurities from a dirty gas flow to be filtered, comprising a housing in which at least one filter cartridge according to the invention is arranged and comprising an end piece which is secured to the housing, wherein an axial end face of the end piece is disposed to face a first axial end surface of the base body of the filter cartridge.

Of preference, the filter unit has a compressed air tank including at least one nozzle and being designed for ejecting the compressed air flow to act upon the filter material.

It is additionally advantageous when the peripheral edge of the first axial end face of the base body takes the shape of a circle with its outer diameter corresponding to the outer diameter of a peripheral edge of an axial end face of the end piece.

It is especially preferred when the end piece takes the shape of a parabola rotated about the longitudinal axis. It is especially preferred when the end piece and the base body jointly take the shape of a parabola rotated about the longitudinal axis, with the end piece being an upper part of the parabola body and the base body being a lower part of the parabola body.

Further, it is preferred when the first axial end face of the base body is adjacent to the axial end face of the end piece. In this way, a joint body constituting the flow guiding device is formed.

In addition, it is of advantage when the end piece and the base body are arranged so that an external shape of the end piece is transformed into an external shape of the base body.

The object of the invention is also achieved by a method for cleaning a filter cartridge according to the invention, preferably in said filter unit, wherein a compressed air flow is ejected from a nozzle of a compressed air tank of the filter unit and after that flows against the flow guiding device including the base body and the end piece and is widened by the external shape of the flow guiding device such that it covers at least 80%, preferably more than 90%, further preferred more than 95%, especially preferred 100%, of the filter material of the filter element.

According to another aspect of the invention, which is independent of the afore-described embodiments but can preferably also be combined with features of the afore-mentioned embodiments, the invention relates to a filter cartridge for removing impurities from a dirty gas flow to be filtered, comprising a cylindrical filter element made from filter material in which a filter insert, for example made from filter material or from air-impermeable material, is inserted, wherein between the filter element and the filter insert, i.e. within the filter cartridge, a preferably annular inner space is formed, with the filter material being designed for being cleaned when a compressed air flow is applied against a flow direction of the dirty gas flow, with a cap in the form of a flow guiding device being provided which is arranged and configured concerning its external shape such that the compressed air flow is widened through the cap so that the entire filter material of the filter element is covered by the compressed air flow and a loss of energy occurring is kept low. This offers the advantage that, on the one hand, the compressed air flow is guided such that the entire filter material or at least the entire filter material of the cylindrical filter element is covered and not only a lower part of the filter element is covered by the compressed air flow. On the other hand, an appropriate design of the external shape of the cap helps to achieve that the energy of the compressed air flow is reduced only minimally, i.e. as far as necessary, during widening. In a filter cartridge according to the invention, thus the service life of the cartridge can be extended both by the fact that the filter cartridge can be cleaned more gently by the improved result of cleaning and has to be cleaned less frequently, and by the fact that compressed air can be saved so that the cost of cleaning can be considerably reduced.

In addition, it is useful when the loss of energy occurring is less than 40%, preferably less than 20% and further preferred less than 10%.

Hereinafter, a direction which is parallel to a central axis of the filter cartridge (and, resp., of the filter element and, resp., of the filter insert and, resp., of the cap) will be referred to as axial direction. In the following, a direction which is an axial direction and in which the compressed air flow is flowing will be referred to as first axial direction. A direction which is opposed to the first axial direction will be referred to as second axial direction. Hence the dirty gas flow flows into the filter cartridge in the second axial direction, while the compressed air flow flows into the filter cartridge in the first axial direction.

Hereinafter, the one axial end of the filter cartridge (and, resp. of the filter element and, resp., of the filter insert and, resp., of the cap) facing the first axial direction will be referred to as a first axial end and the other axial end of the filter cartridge (and, resp., of the filter element and, resp., of the filter insert and, resp., of the cap) facing the second axial direction will be referred to as second axial end.

It is further advantageous when the cap is arranged at least partially within the inner space of the filter cartridge. This helps to prevent the axial length of the filter cartridge from being increased by the cap.

Moreover, it is advantageous when the inner space of the filter cartridge has an annular cross-section constant at least in portions, when viewed along the axial length of the filter insert and/or of the filter element. On the one hand, thus the volume of the inner space can be minimized as compared to an inner space of non-constant annular cross-section which is obtained e.g. with a conical filter insert, so that it is easier to generate higher pressure in the inner space of the filter cartridge. At the same time, the filter area of the filter cartridge can be increased.

It is furthermore of advantage when the inner space has a constant annular cross-section along the entire axial length of the filter insert and/or of the filter element. In this way, the result of cleaning is additionally improved as the cross-section remains constant and thus the compressed air flow need not be further widened over the axial length of the filter insert, thus preventing additional loss of energy of the compressed air flow.

A proper exemplary embodiment excels by the fact that the filter insert has a cylindrical outer diameter. On the one hand, the afore-mentioned advantages thus can be achieved and, on the other hand, the structure of the filter cartridge is considerably facilitated in this way.

It is additionally preferred when the external shape of the cap is convex, preferably strictly convex. This means that the cap bulges toward the compressed air flow. This also means that the cap bulges outwardly or is bulged outwardly when viewed from the filter insert. This allows to achieve an especially appropriate flow bypass when the compressed air flow impinges on the external shape of the cap. Especially, the configuration is preferred with respect to minimizing the loss of energy and with respect to widening the compressed air flow to the desired diameter of the inner space.

It is also advantageous when the cap is arranged at an axial end of the filter insert. It is also especially preferred when the cap is secured to the filter insert, especially to an axial end face of the filter insert. It is especially preferred when a cross-section of the cap is transformed into a cross-section of the filter insert, i.e. that an outer diameter of the cap corresponds to an outer diameter of the filter insert at the position where the cap is adjacent to the filter insert. This means also that the outer diameter of the cap at the second axial end of the cap corresponds to the outer diameter of the filter insert at the first axial end of the filter insert. In this way, the compressed air flow is advantageously achieved to flow past the cap and then past the outside of the filter insert.

Hence, an appropriate exemplary embodiment excels by the fact that an outer diameter at an end of the cap facing the filter insert, thus at the second axial end of the cap, substantially corresponds to the outer diameter at an end of the filter insert facing the cap, thus at the first axial end of the filter insert. Consequently, the outer shape of the cap is transformed quasi "seamlessly" into the filter insert.

Moreover, it is of advantage when the cap and the filter cartridge and/or the filter element and/or the filter insert are coaxially arranged. Thus, an even flow of the compressed air flow can be effectuated.

It is further preferred when the cap is formed, for example depending on requirements to weight or stiffness, from solid material or in a sleeve-type/shell-type manner.

Especially, it is of advantage when the external shape of the cap follows a parabolic function and, resp., a root function. This means that an outer contour of the cap follows a root function from a first axial end of the cap at which the cap is maximally curved to its second axial end which is opposed to the first axial end in the axial direction. This also means that the cap is rotation-symmetric, with the cap being formed by rotation of a parabola about its longitudinal axis. Hence this means that each longitudinal cross-section of the cap is in the form of a parabola. Furthermore, it means that each cross-section of the cap has a circular shape.

Moreover, the cap is advantageously designed so that a slope of the parabola which is followed by the external shape of the cap decreases in the axial direction from the first axial end. Hence this means that the outer diameter of the cap increases from the first axial end of the cap where the cap is maximally curved toward its other axial end, viz. the second axial end, in the axial direction, but with an increasing axial length its outer diameter is increasing less strongly.

It could also be stated that the external shape of the cap is configured so that its shape corresponds to the nose of a supersonic aircraft. Thus, the cap has an egg-shaped apex. In other words, the first axial end of the cap is stub and, viz., not pointed.

In addition, it is appropriate when the external shape of the cap follows the function $f(x)=x^{1/2}$ (in words: x to the power of one half). When configuring the cap to take said external shape, especially favorable surrounding flow conditions are provided which are optimized especially for incident flow at high velocities.

It is of further advantage when the external shape of the cap is adapted to an outer diameter of the inner space of the filter cartridge so that the compressed air flow is widened to the filter material of the filter element. Thus, the compressed air flow is passed to where it cleans the filter material by flowing through the filter material of the filter element from the inside to the outside, i.e. against the direction of the dirty gas flow.

It is moreover preferred when an axial length of the cap has 0.5 to 2 times the size of an outer diameter of the inner space of the filter cartridge. Further preferred, the axial length of the cap is 1.5 to 1.0 times the size of the outer diameter of the inner space of the filter cartridge. In this way, a suitable compromise/trade-off is achieved between the widening of the compressed air flow and the loss of energy of the compressed air flow when it impinges on the cap.

In addition, it is preferred when the external shape of the cap is designed for being approached by a flow at high velocity. I.e. the external shape of the cap is configured especially such that, when it contacts and viz. is approached by a flow spreading at high velocity to supersonic velocity, it realizes the desired widening and, at the same time, the thus occurring loss of energy is minimized. Such external shape is used already in other applications, for example in the field of aircraft noses.

It is further advantageous when, at the second axial end of the filter cartridge, an annular component is arranged for connecting the filter element at the second axial end to the filter insert at the second axial end. This prevents the filtered dirty gas from the inner space from mixing with the unfiltered dirty gas outside the filter cartridge. At the same time, stability is imparted to the filter cartridge.

The annular component is configured to be air-impermeable so that it imparts additional stability to the filter cartridge as a stronger material can be used. Especially the filter insert and the filter element are inserted into a pan being filled with molding material, e.g. resin, and are joined in a sealed manner.

Moreover, it is appropriate when an aperture is provided at a first axial end of the filter cartridge out of which advantageously the purified air may flow. In other words, the first axial end is the end of the filter cartridge from which the filtered dirty gas flow, viz. the clean gas flow, exits. The second axial end of the filter cartridge, on the other hand, is closed, i.e. the air outside the filter cartridge cannot mix with the air inside the filter cartridge. The air can enter the inner space of the filter cartridge through filter material only.

In particular, it is preferred when the aperture has a circular design. A preferred exemplary embodiment also excels by the fact that the aperture is transformed into the inner space of the filter cartridge between the filter insert and the filter element. In the axial direction starting from the first axial end of the filter cartridge to the first axial end of the cap, the filter cartridge thus has a circular cross-section. The cap and the filter insert connected to the cap in the axial direction impart an annular cross-section to the inner space of the filter cartridge from the first axial end of the cap to the second axial end of the filter cartridge. Thus, the cap is preferably configured such that the compressed air flow is guided smoothly, i.e. with minimized loss of energy, from the circular cross-section into the annular cross-section, i.e. is widened along the external shape of the cap.

The filter cartridge is operated during a filtering operation in which the dirty gas flow to be filtered flows through the filter material such that the flow passes through the filter cartridge from its second axial end toward its first axial end. This means that the dirty gas flow is passed from the outside to the inside into the inner area through the filter element, especially through the filter material of the filter element. Also, this means that, when the filter insert is formed of filter material, the dirty gas flow is passed from the inside to the outside into the inner area through the filter insert, especially through the filter material of the filter insert. However, it is also possible to configure the filter insert of air-impermeable/non-flowable material so that the filter insert acts as a displacement body which improves the cleaning result.

Moreover, in a preferred exemplary embodiment, the filter cartridge is designed so that the dirty gas flow exits the filter material as a clean gas flow. This means that the entire inner space of the filter cartridge forms a clean gas chamber which is surrounded by the filter material of the filter element and of the filter insert and which includes the filtered raw gas, before it flows out of the aperture.

In addition, it is of advantage when the filter material of the filter element and/or of the filter insert is folded in star shape, i.e. that a cross-section of the filter element and/or of the filter insert is star-shaped, as in this way it includes an enlarged filtering surface, which has a positive effect on the result of filtering.

The object of the invention is also achieved by a filter unit for removing impurities on a dirty gas flow to be filtered, wherein the filter unit includes a housing in which at least one filter cartridge according to the invention is arranged, a compressed air tank which has at least one nozzle and is designed to eject the compressed air flow for acting on the filter material.

Especially, it is of advantage when the compressed air tank is designed to eject a compressed air flow at a pressure of 4 to 8 bars. This helps to achieve a good cleaning result.

Accordingly, the external shape of the cap of the filter cartridge according to the invention is adapted both to the outer diameter of the inner space, i.e. to the inner diameter of the filter cartridge, and to the distance between the nozzle and the filter cartridge, viz. so that the compressed air flow is widened by the cap so that the entire filter material is covered by the compressed air flow and an accompanying loss of energy is minimized. The external shape of the cap thus is dependent both on the dimensions of the filter cartridge, especially on an outer diameter, and on a distance between the nozzle from which the compressed air flow is ejected and the filter cartridge and on the flow velocity of the compressed air flow and, resp., the energy of the compressed air flow.

The distance in the axial direction between the nozzle and the filter cartridge can be reduced by the cap as the aperture angle of the free jet is enlarged and thus also the filter medium/filter material at the filter cartridge inlet, i.e. in the upper part of the filter cartridge, is cleaned.

Accordingly, it is especially advantageous when the nozzle is configured so that the compressed air flow exits the nozzle at high velocity to supersonic velocity. In particular, it is of advantage when the nozzle is a Laval nozzle.

It is further appropriate when the distance in the axial direction between the nozzle and the filter cartridge is smaller than three times the outer diameter of the inner space of the filter cartridge, preferably smaller than the twice the outer diameter of the inner space of the filter cartridge, further preferred smaller than 1.5 times the outer diameter of the inner space of the filter cartridge. Hence in this way especially the construction space of the entire filter unit in the axial direction can be minimized.

In addition, it is advantageous when the filter cartridge is disposed in the horizontal direction or preferably in the vertical direction. I.e. that the axial direction of the filter cartridge is in conformity with a horizontal direction and, resp., a vertical direction/direction of gravity. Especially when the filter cartridge is arranged vertically, during cleaning the dust can drop downwards in the direction of gravity without depositing on the filter element again.

A favorable exemplary embodiment excels by the fact that plural filter cartridges are arranged in the filter unit, thus allowing the filtering capacity of the entire filter unit to be increased.

Additionally, it is of advantage when an axial length of the filter insert is smaller than an axial length of the filter element. In other words, the filter insert is completely disposed within the filter element. I.e. that especially in the axial direction it does not protrude from the axial length of the filter element. This means also that the filter insert may at most exhibit the same axial length as the axial length of the filter element.

The invention also relates to a method of purifying/cleaning a filter cartridge according to the invention which is preferably arranged in a filter unit according to the invention. The method comprises the steps of a compressed air flow at first being ejected from a nozzle, then approaching the cap of the filter cartridge and being widened by the external shape of the cap so that it covers the entire filter material of the filter element.

According to a further aspect of the invention which is independent of the above-described embodiments but preferably can also be combined with features of the aforementioned embodiments, the invention relates to a filter cartridge for removing impurities from a dirty gas flow to be filtered, comprising a cylindrical filter element made from filter material in which a filter insert, for example made from filter material or an air-impermeable material, is inserted, wherein between the filter element and the filter insert an annular inner space is formed, the filter material being designed to be cleaned when a compressed air flow is applied against a flow direction of the dirty gas flow, wherein a cap in the form of a flow guiding device is provided for guiding the compressed air flow, with the cap being disposed so that it projects from an axial length of the filter element in the axial direction. This means that the cap protrudes from the filter element in the axial direction. This offers the advantage that the compressed air flow can be widened to the desired annular cross-section and, resp., to the desired inner diameter to be pressurized with compressed air already before reaching the filter element so that the axial distance between a compressed air flow source and the filter cartridge can be reduced, which has a favorable effect on the axial space required of the entire filter unit. Moreover, by the "earlier widening" in the axial direction design freedoms as regards the external shape of the cap are obvious so that the compressed air flow may be widened e.g. more slowly, i.e. less strongly, which is beneficial as regards a reduction of the loss of energy during widening.

Moreover, it is advantageous when a first axial end of the cap is disposed in the axial direction outside the filter element. Hence, it can be advantageously brought about that the compressed air flow is widened to the desired diameter already when it reaches the filter element so that also a portion of the filter element at a first axial end, viz. at an end facing a compressed air flow, can be covered by the compressed air flow and thus can be sufficiently cleaned.

It is further advantageous when an outer diameter of the cap increases from the first axial end of the cap to a second axial end of the cap opposed to the first axial end of the cap. This means that the outer diameter of the cap at the first axial end is smallest when viewed along an axial length of the cap, and the outer diameter of the cap at the second axial end is largest, when viewed along an axial length of the cap. Since the compressed air flow first impinges on the cap at the first axial end of the cap, the compressed air flow is specifically guided radially outwardly and thus widened by the expanding external shape of the cap. Consequently, a slope or, resp., a curvature of the outer diameter widening helps to control the direction and, resp., the flow path in/to which the compressed air flow is guided.

It is further preferred when the second axial end of the cap is arranged in the axial direction within the filter element. Thus, advantageously the compressed air flow flowing along the external shape of the cap is ensured to flow into the inner space of the filter cartridge and from there to cover the walls of the filter cartridge.

Moreover, a favorable exemplary embodiment excels by the fact that the cap includes two portions, wherein a first portion of the cap is arranged in the axial direction outside the filter element and a second portion of the cap is arranged within the filter element. This is to say that the first portion of the cap is the part of the cap which in the axial direction protrudes from the filter element, while the second portion of the cap is the part of the cap which is arranged in the axial direction within the filter element, i.e. is disposed at the same axial height as the filter element. In other words, the cap is disposed partly in the inner space of the filter cartridge and partly outside the inner space of the filter cartridge. In this way, the compressed air flow can be guided especially advantageously to the walls of the filter cartridge, viz. to the filter material of the filter element and to the filter material of the filter insert. Simultaneously, the distance between the compressed air source and the filter cartridge can be considerably reduced in contrast to a filter cartridge in which the cap is arranged completely within the filter element, viz. completely in the inner space.

It is additionally advantageous when the first portion of the cap and the second portion of the cap are formed integrally, i.e. in one piece. Thus, on the one hand, the manufacturing costs of the cap can be reduced and, on the other hand, the mounting method can be facilitated, as the two portions need not be aligned with each other and mounted to each other. Moreover, in this way an especially smooth, i.e. seamless/infinite, transition between the two portions can be realized.

It is further possible to form the first portion of the cap and the second portion of the cap separately, i.e. as components separate from each other. This enables the two portions to be mounted separately from each other, e.g. the one portion is mounted to a component fixed to the housing and the other portion is mounted to the filter cartridge, so that only when the filter cartridge is inserted into the filter unit, a complete cap is formed. This may facilitate replacement of the filter cartridge.

Further, it is appropriate when the first portion of the cap in the axial direction has an axial length which is 0.5 to 1.0 times the size of an inner diameter of the filter element. In this way, especially favorable flow guiding properties can be brought about, in particular a reduction of the loss of energy of the compressed air flow, as the compressed air flow can be widened relatively smoothly. Moreover, the axial protrusion of the filter cartridge is thus maintained at an appropriate dimension so that replacement the filter cartridge remains possible.

Moreover, a favorable exemplary embodiment excels by the fact that the first portion of the cap has a larger axial length than the second portion of the cap. This means that a larger part of the cap is disposed outside the filter element as regards the axial extension. Especially in filter cartridges having a large inner diameter this helps to bring about an optimized cleaning result.

In addition, it is advantageous when the cap is arranged completely outside the filter element, i.e. in the axial direction not inside the filter element, and hence not at the same axial height as the filter element. In this way, the entire length of the filter element can be advantageously cleaned, because the compressed air flow is widened to the diameter of the filter element already upon entry in the filter cartridge.

However, in an alternative embodiment it is also possible that the first portion of the cap has a smaller axial length than the second portion of the cap. This means that a larger part of the cap is disposed within the filter element with respect to the axial extension. Especially in filter cartridges having a relatively small axial extension the cleaning result thus can be improved.

The object of the invention is also achieved by a filter unit for removing impurities from a dirty gas flow to be filtered, comprising a housing in which at least one said filter cartridge is arranged and comprising a compressed air tank which includes at least one nozzle and is designed to eject the compressed air flow from the nozzle for acting on the filter material. In the filter unit according to the invention, thus preferably plural filter cartridges according to the invention are disposed to which a compressed air flow in the form of a compressed air blast can be applied by a respective nozzle arranged coaxially to the filter cartridge but spaced apart in axial direction, for cleaning the filter material. By inserting the cap into the filter cartridge, the distance between the nozzle and the filter cartridge can be reduced, as the compressed air flow exiting from the nozzle as free jet having an aperture angle of about 12° is additionally widened by the cap. This helps to widen the filter material of the filter element, even when the distance is reduced, so that the inner diameter of the filter cartridge is reached.

Also, a distance between the filter element and the nozzle is preferred to be smaller than 2.0 times, preferably smaller than 1.8 times, further preferred smaller than 1.5 times, moreover preferred smaller than 1.0 times, even preferred smaller than 0.5 times, the size of the inner diameter of the filter element. In this way, the filter unit can be configured to be especially compact in the axial direction.

In addition, it is advantageous when an external shape of the cap is adapted both to the distance between the cap and the nozzle and to the inner diameter of the filter element so that the compressed air flow is widened so that the filter material of the filter element is covered by the compressed air flow. By appropriately selecting the external shape of the cap, the loss of energy of the compressed air flow thus can be reduced, preferably minimized, when the latter impinges on the cap.

The object of the invention is also achieved by a method for cleaning said filter cartridge, preferably in such filter unit, wherein a compressed air flow is ejected from a nozzle, then approaches the cap of the filter cartridge and is widened by the external shape of the cap so that it covers the entire filter material of the filter element.

BRIEF DESCRIPTION OF THE DRAWINGS

Hereinafter, the invention will be illustrated by means of drawings, wherein.

The figures are merely schematic and serve exclusively for the comprehension of the invention. Like elements are provided with like reference numerals. The features of the different exemplary embodiments may be exchanged for each other.

DETAILED DESCRIPTION OF THE INVENTION

Figure 1:
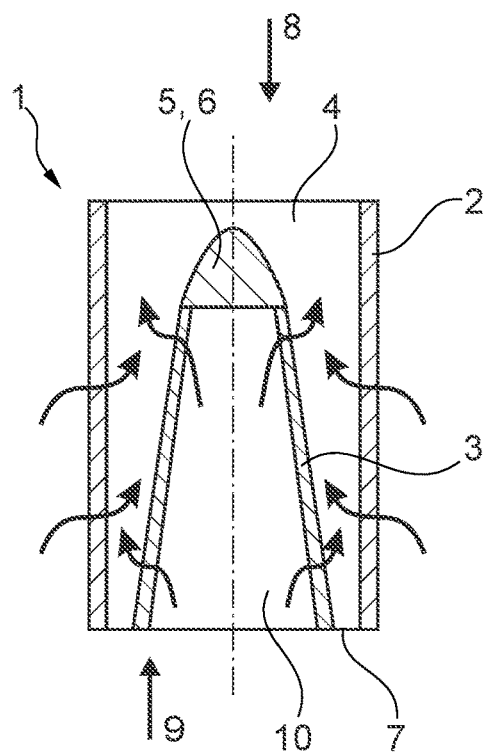
FIG. 1 shows a schematic longitudinal sectional view of a filter cartridge in a first exemplary embodiment, comprising a conical filter insert, a cylindrical filter element and a flow guiding device disposed within the filter cartridge.

FIG. 1 illustrates a filter cartridge 1 for removing impurities from a dirty gas flow to be filtered. The filter cartridge 1 includes a cylindrical filter element 2, also referred to as an outer pack, with the filter element 2 being made from filter material. In the cylindrical filter element 2 a filter insert 3 is inserted. The filter insert 3 is also referred to as an inner pack. The filter insert 3 is made from filter material. The filter element 2 and the filter insert 3 are arranged coaxially to each other. Within the filter cartridge 1 thus an inner space 4 is formed which is ring-shaped in the area between the filter element 2 and the filter insert 3. The filter material of the filter element 2 and of the filter insert 3 is designed so that it is cleaned when compressed air flow which flows against a flow direction of the dirty gas flow is applied. The filter cartridge 1 includes a cap 6 in the form of a flow guiding device 5 which is disposed and designed with respect to its external shape so that the compressed air flow is widened by the cap 6 such that the entire filter material of the filter element 2 is covered by the compressed air flow and an accompanying loss of energy is minimized. The filter element 2 has an arc-shaped cross section. The filter insert 3 has an arc-shaped cross section.

The cap 6 is disposed completely within the filter cartridge 1 in the first exemplary embodiment of FIG. 1. The cap 6 is secured to the filter insert 3. The cap 6 has a parabolic cross-section, i.e. the cap 6 corresponds to a parabola being rotated about the longitudinal axis of the parabola.

At an end of the filter cartridge 1, viz. the lower end in the drawings, between the filter element 2 and the filter insert 3 a filter bottom/annular component 7 is arranged which connects the filter element 2 to the filter insert 3. A direction pointing from the top to the bottom in the drawings will hereinafter be referred to as a first axial direction 8, while a direction opposite to the first axial direction will be referred to as second axial direction 9. The annular component/filter bottom 7 is formed to be air-impermeable so that the dirty gas flow outside the filter cartridge 1 may enter into the inner space 4 either from the outside to the inside through the filter material of the filter element 2 or from an inner area 10 disposed radially inside the filter insert 3 to the outside through the filter material of the filter insert 3. The flow path of the dirty gas flow is indicated by arrows in FIG. 1.

During filtering operation of the filter cartridge 1, the dirty gas flow flows into the inner space 4 of the filter cartridge 1. For cleaning the filter cartridge 1 supply of a dirty gas flow is interrupted and compressed air is applied to the filter material of the filter cartridge 1 against the flow direction during the filtering operation. I.e. a compressed air flow in the form of a compressed air blast flows in the direction of the first axial direction 8 and impinges on the filter cartridge 1, from the top in the drawings. By the cap 6 the compressed air flow is guided into the annular part of the inner space 4 so that it flows from the inside to the outside through the filter material of the filter element 2 and from the outside to the inside through the filter material of the filter insert 3 into the inner zone 10 and frees particles accumulated in the filter material such as e.g. dust. The freed particles then drop downwards in the direction of gravity and are collected in a dust collector (not shown) and are removed.

In the filter cartridge 1 in FIG. 1 the filter insert 3 is conical. The filter insert 3 includes, at its end facing the first axial direction 8, viz. a first axial end, a smaller outer diameter than at its second axial end opposite to the first axial end. In the shown exemplary embodiment, the outer diameter linearly increases from the first axial end to the second axial end, but it may as well increase in a non-linear manner so that a radial outer surface of the filter insert 3 has a curved configuration, for example. On the first axial end of the filter insert 3 the cap 6 is arranged.

At a contact face between the filter insert 3 and the cap 6 the outer diameter of the cap 6 is smoothly transformed into the outer diameter of the filter insert 3. This means that the outer diameter of the filter insert 3 at its first axial end corresponds to the outer diameter of the cap 6 at an end facing the second axial direction 9, viz. a second axial end, of the cap 6. The outer diameter of the cap 6 increases from the first axial end of the cap opposite to the second axial end to the second axial end of the cap. In the shown exemplary embodiment, the outer diameter increases more strongly from the first axial end of the cap, but increases less with an increasing axial length of the cap 6. This is to say that the slope of the outer diameter of the cap 6 decreases in the axial direction (from the first axial end toward the second axial end).

In the shown exemplary embodiment, the cap 6 is disposed completely within the inner space 4 of the filter cartridge 1, i.e. that in the axial direction the cap 6 does not extend to an end facing the first axial direction 8, viz. a first axial end, of the filter cartridge 1 and thus of the filter element 2. Hence, in the upper area of the filter cartridge 1 the inner space 4 of the filter cartridge 1 has a circular cross-section which is transformed into an annular cross-section by the cap 6.

Figure 2:
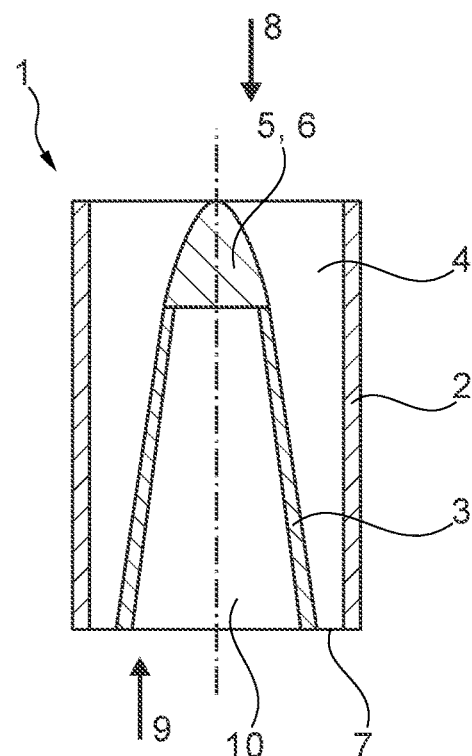
FIG. 2 shows a schematic longitudinal sectional view of the filter cartridge in a second exemplary embodiment.

The filter cartridge 1 in FIG. 2 differs from the filter cartridge 1 of FIG. 1 in that the cap 6 extends in the axial direction to the first axial end of the filter cartridge 1. The inner space 4 thus has an annular cross-section along the entire axial length of the filter element 2 and, consequently, of the filter cartridge 1.

Figure 3:
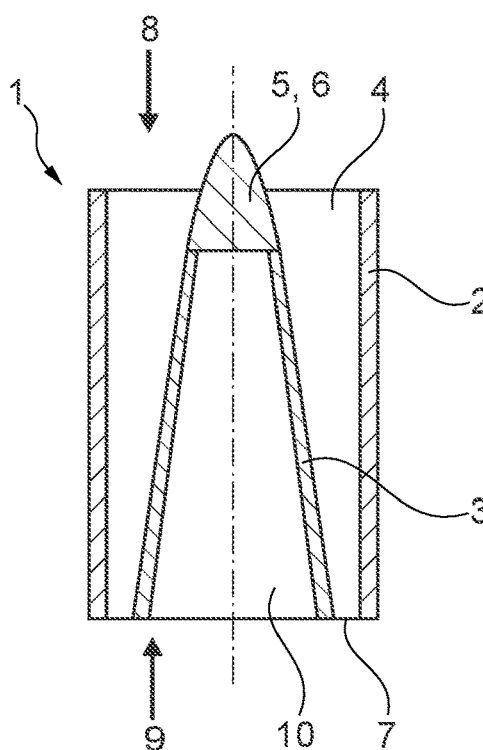
FIG. 3 shows a schematic longitudinal sectional view of the filter cartridge in a third exemplary embodiment in which the flow guiding device is disposed partly within the filter cartridge and partly outside the filter cartridge.

The filter cartridge 1 in FIG. 3 differs from the filter cartridge 1 of FIG. 1 or FIG. 2 in that the cap 6 extends in the axial direction beyond the first axial end of the filter cartridge 1. The cap 6 thus protrudes in the axial direction from the filter element 2. The inner space 4 has an annular cross-section along the entire axial length of the filter element 2 and thus of the filter cartridge 1.

Figure 4:
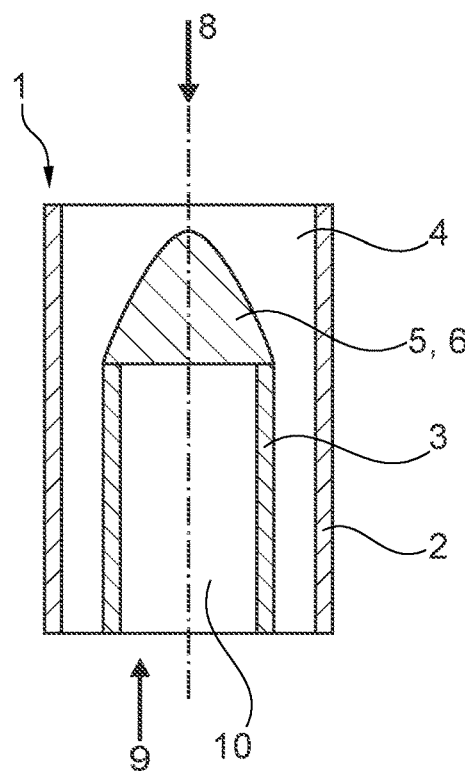
FIG. 4 shows a schematic longitudinal sectional view of the filter cartridge in a fourth exemplary embodiment, comprising the cylindrical filter element and a cylindrical filter insert.

In the filter cartridge 1 in FIG. 4 the filter insert 3 has a cylindrical configuration. This means that the filter insert 3 has a constant outer diameter along its entire axial length. In this way, the inner space 4 is formed in the area of the axial length of the filter insert 3 as an annular inner space 4 having a constant annular cross-section. In the exemplary embodiment shown in FIG. 4, the cap 6 is arranged completely inside the inner space 4 of the filter cartridge 1, i.e. in the axial direction the cap 6 does not extend to the first axial end of the filter cartridge 1 and thus of the filter element 2. Consequently, in the upper area of the filter cartridge 1 the inner space 4 of the filter cartridge 1 has a circular cross-section which is transformed into an annular cross-section by the cap 6.

Figure 5:
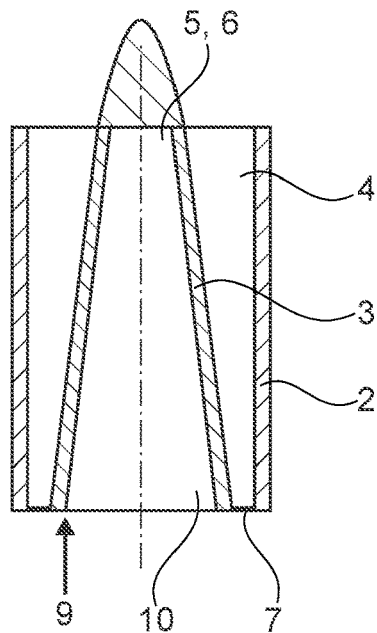
FIG. 5 shows a schematic longitudinal sectional view of the filter cartridge in a fifth exemplary embodiment in which the flow guiding device is disposed completely outside the filter cartridge.

The filter cartridge 1 in FIG. 5 differs from the filter cartridge 1 of FIG. 3 by the fact that the cap 6 is arranged completely outside the filter cartridge 1. The cap 6 thus does not protrude in the axial direction into the filter element 2. In the exemplary embodiment shown in FIG. 5, the cap 6 ends flush with an axial end face of the filter cartridge 1, i.e. in the axial direction the cap 6 is adjacent to the filter cartridge 1. The filter bottom 7 is in the form of a pan in which the filter element 2 and the filter insert 3 are sealed and joined by means of a sealing compound.

Figure 6:
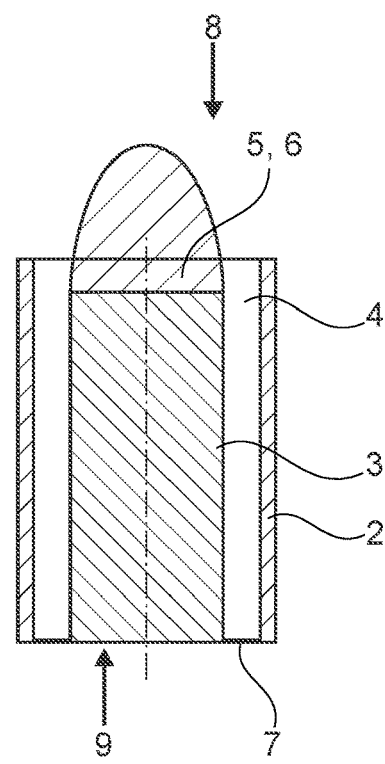
FIG. 6 shows a schematic longitudinal sectional view of the filter cartridge in a sixth exemplary embodiment between the cylindrical filter element and a cylindrical filter insert made from air-impermeable material which serves as a displacement body.
Figure 8:
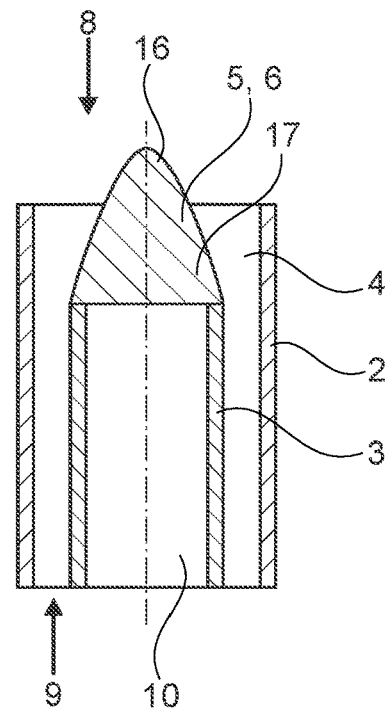
FIG. 8 shows a schematic longitudinal sectional view of the filter cartridge in an eighth exemplary embodiment in which the flow guiding device is disposed partly within the filter cartridge and partly outside the filter cartridge.

The filter cartridge 1 in FIG. 6 differs from the filter cartridge 1 of FIG. 8 in that the filter insert 3 is configured to be air-impermeable and serves as a displacement body. The filter insert 3 may be, as shown in FIG. 6, in the form of a solid body or, as it is not shown, in the form of a hollow body or a shell. The filter insert 3 in the form of a displacement body helps to improve the result of cleaning as the compressed air flow can escape through the filter element 2 only.

Figure 7:
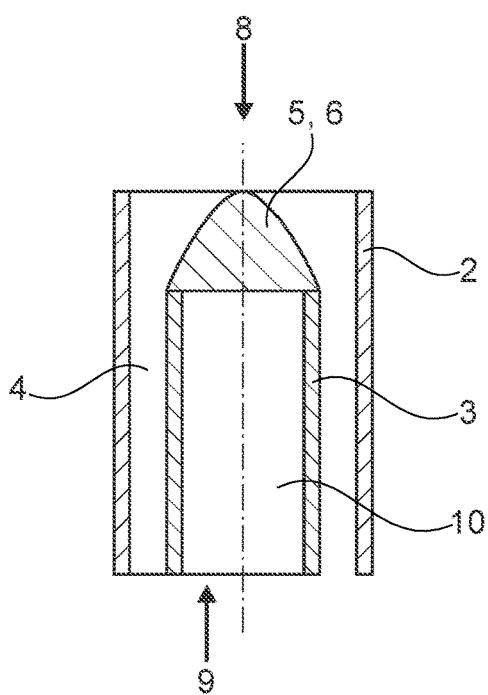
FIG. 7 shows a schematic longitudinal sectional view of the filter cartridge in a seventh exemplary embodiment.

The filter cartridge 1 in FIG. 7 differs from the filter cartridge 1 of FIG. 4 in that the cap 6 extends in the axial direction to the first axial end of the filter cartridge 1. Hence the inner space 4 has an annular cross-section along the entire axial length of the filter element 2 and thus of the filter cartridge 1. Accordingly, the inner diameter of the annular cross-section increases from the first axial end of the filter cartridge 1 to the first axial end of the filter insert 3 depending on the external shape of the cap 6. From the first axial end of the filter insert 3 to the second axial end of the filter cartridge 1 the annular cross-section is constant.

In the filter cartridge 1 in FIG. 8 the cap 6 is arranged such that a first portion of the cap 6 including the first axial end of the cap 6 protrudes in the axial direction from the filter element 2 and another second portion of the cap 6 including the second axial end of the cap 6 is disposed within the filter element 2. The first portion and the second portion may be formed either separately from each other or integrally. This shall be illustrated in detail hereinafter.

Figure 9:
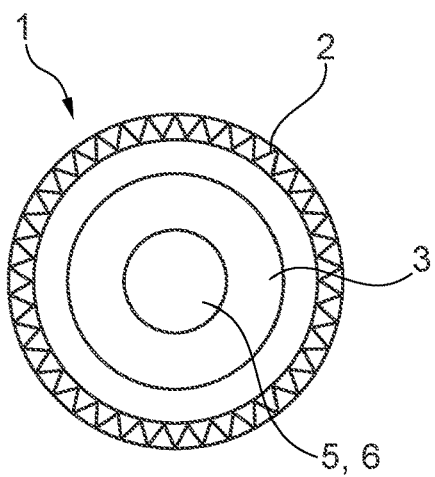
FIG. 9 shows a schematic cross-sectional view of the filter cartridge comprising the conical filter insert.
Figure 10:
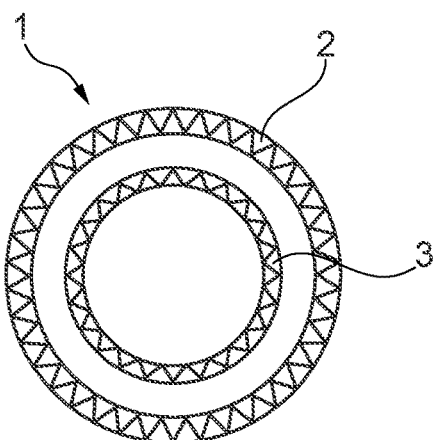
FIG. 10 shows a schematic cross-sectional view, cut in the axial zone of the filter insert, of the filter cartridge comprising the cylindrical filter insert made from filter material.
Figure 12:
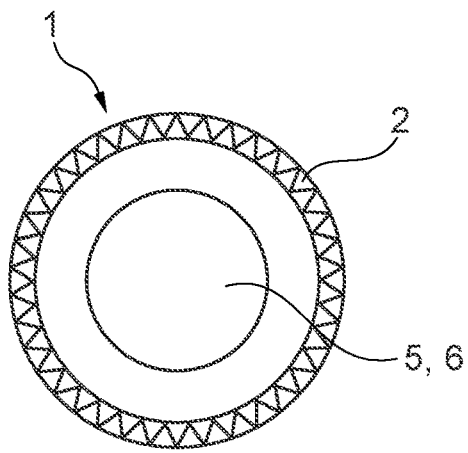
FIG. 12 shows a schematic cross-sectional view of the filter cartridge, cut in the area of the flow guiding device.

FIGS. 9, 10 and 12 illustrate a cross-section of the filter cartridge 1. The filter element 2, the filter insert 3 and the cap 6 are arranged coaxially with each other. The filter insert 3 and the cap 6 are superimposed in the axial direction, whereas the filter element 2 is disposed at the same axial height as the filter insert 3 and the cap 6. The cross-section shown in FIG. 9 is cut in the axial area of the cap 6. The filter element 2 has a larger outer diameter than the filter insert 3 and the cap 6. The filter insert 3 has a larger outer diameter than the cap 6. The filter element 2 is made from filter material which is zig-zag folded so that the filter element 2 has a star-shaped cross-section. The filter insert 3, too, is made from zig-zag folded filter material, which is evident from FIG. 10 illustrating a cross-section cut in the axial area of the filter insert 3. FIG. 12, too, shows a cross-section of the filter cartridge 1 which is cut in the axial area of the cap 6 but at an axial position other than that in FIG. 9. This reveals that the cross-section of the cap 6 varies over the axial direction, whereas the cross-section of the filter element 2 is constant along the entire axial length.

Figure 11A:
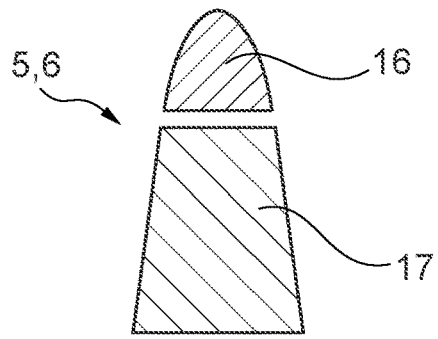
FIG. 11a shows a schematic longitudinal sectional view of a divided flow guiding device.
Figure 11B:
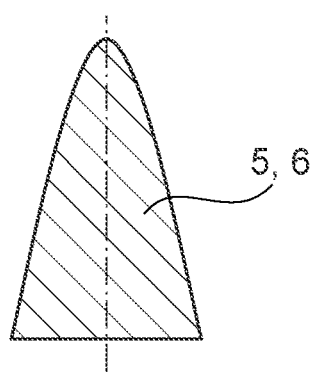
FIG. 11b shows a schematic longitudinal sectional view of the flow guiding device.
Figure 13:
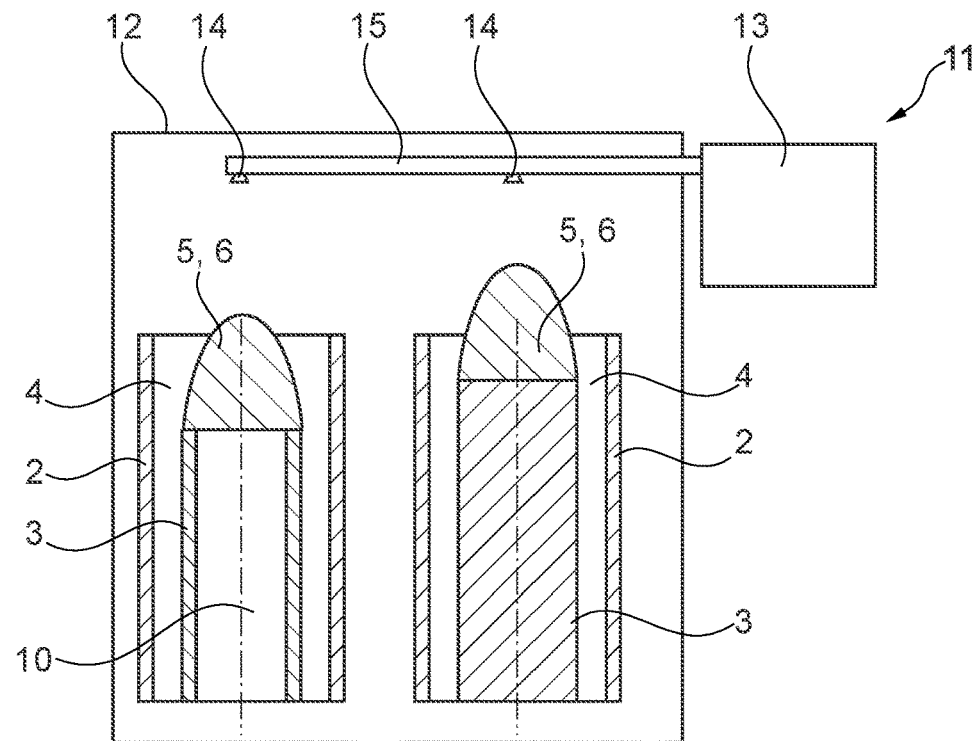
FIG. 13 shows a schematic longitudinal sectional view of a filter unit according to the invention.
Figure 14:
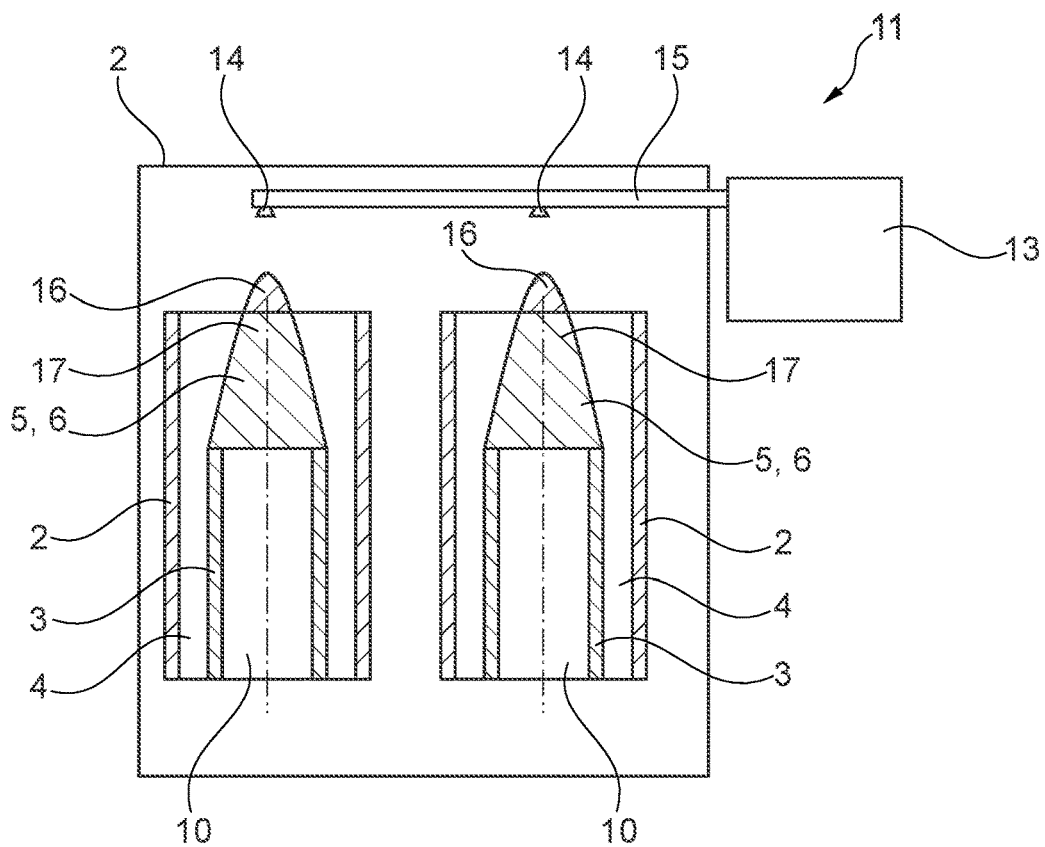
FIG. 14 shows a schematic longitudinal sectional view of the filter unit in a second exemplary embodiment.

FIG. 11b illustrates a schematic view of the cap 6. The cap 6 has a parabolic shape or, resp., root shape. The cap 6 is rotation-symmetric. Each longitudinal section across the axis of the cap 6 is identical and parabola-shaped. An external shape of the cap 6 increases in the outer diameter from the first axial end to the second axial end. At the first axial end the cap 6 has an egg-shaped, i.e. round, apex. The external shape of the cap 6 is curved, with the curvature being largest at the first axial end. The curvature decreases in the axial direction from the first axial end to the second axial end of the cap 6. The external shape of the cap 6 substantially follows the function $f(x)=x^{1/2}$ or, resp., a similar parabolic function. The cap 6 may be in the form of a solid body or a hollow body, i.e. in the form of a shell. The external shape of the cap 6 is configured such that in the event of a vertical incident flow, i.e. an incident flow from the first axial direction 8, it widens the incident flow with especially low loss of energy. Especially, the external shape of the cap 6 is optimized for incident flow in the range of high velocities to beyond supersonic velocity. At the second axial end, the cap 6 includes a plane axial outer surface which is disposed normal to the axis of the cap 6. FIGS. 13 and 14 illustrate a filter unit 11 according to the invention. The filter unit 11 includes a housing 12 in which two filter cartridges 1 are arranged. The filter cartridges 1 are disposed to be insertable into the housing 12 via holding rails (not shown). In FIG. 13, filter cartridges 1 according to an exemplary embodiment of FIG. 6 and, resp., FIG. 8 are inserted and in FIG. 14 filter cartridges 1 according to an exemplary embodiment of FIG. 8 having a divided cap 6 according to the exemplary embodiment of FIG. 11a are inserted. The invention is not limited to a filter unit 11 including the filter cartridges 1 shown in FIGS. 13 and 14, however.

The filter unit 11 includes a compressed air tank 13 which is optionally disposed within the housing 12 or outside the housing 12. The compressed air tank 13 is designed so that it ejects compressed air, preferably at a pressure of 4 to 8 bars, through nozzles 14 disposed above the filter cartridges 1. The compressed air tank 13 and the nozzles 14 are interconnected via a pipe/blow pipe 15 for forwarding the compressed air. For each filter cartridge 1 one nozzle 14 is provided which is arranged on the axis of the filter cartridge 1 but spaced apart in the axial direction.

The external shape of the cap 6 is adapted both to the distance between the nozzle 14 and the first axial end of the cap 6 and, resp., the first axial end of the filter cartridge 1 and to the size of the inner space 4, especially an outer diameter of the inner space 4, viz. an inner diameter of the filter element 2, so that the compressed air flow is guided to the filter material to be cleaned.

In the exemplary embodiment shown in FIG. 14, the cap 6 is configured so that a first portion 16/an end piece 16 protrudes from the filter element 2 in the axial direction and a second portion 17/a base body 17 is disposed inside the filter element 2. In this way, the compressed air flow is widened already in the axial direction more closely to the nozzle 14 so that an axial distance between the nozzle and the filter cartridge 1 can be reduced.

The first portion 16 and the second portion 17 of the cap 6 are formed integrally (cf. FIGS. 11b and 13) or separately from each other (cf. FIGS. 11a and 14).

In a separate configuration (cf. FIG. 11a, FIG. 14) the first portion/the end piece 16 of the cap 6 is tightly connected to the housing 12 and the second portion/the base body 17 of the cap 6 is tightly connected to the filter cartridge 1. The two portions 16, 17 need not be interconnected in a separate configuration. It is sufficient when the two portions 16, 17 are arranged to be adjacent each other or to have a small gap, which is e.g. smaller than a wall thickness of the filter element 2, between the two portions 16, 17. The second portion 17 thus takes the shape of a parabolic frustum. When, in a filter unit 11 of FIG. 14, a filter cartridge 1 is replaced, the first portion 16 of the cap 6 is retained in the housing 12.

The second portion 17 of the cap 6 includes a plane axial outer surface at its first axial end facing the first axial direction 8. The (first) axial outer surface/end face is circular and has the same outer diameter as an axial outer surface/end face of the first portion 16. An outer edge/peripheral edge of the axial end face of the second portion 17 of the cap 6 is completely located in a plane in which also an axial end face of the filter element 2 is disposed. This means that the second portion 17 of the cap 6 in the axial direction terminates flush with the filter element 2. The second portion 17 of the cap 6 increases in its outer diameter from the first axial end of the second portion 17 to the second axial end of the second portion 17. Radial outer surfaces of the second portion 17 are preferably configured to be curved slightly outwardly or to be linear/plane/straight.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

LIST OF REFERENCE NUMERALS

1 filter cartridge
2 filter element
3 filter insert
4 inner space
5 flow guiding device
6 cap
7 annular component/filter bottom
8 first axial direction
9 second axial direction
10 inner area
11 filter unit
12 housing
13 compressed air tank
14 nozzle
15 pipe
16 first portion/end piece
17 second portion/base body

We claim:

1. A filter unit for removing impurities from a dirty gas flow to be filtered, comprising:
   a filter cartridge for removing impurities from a dirty gas flow to be filtered,
   a housing in which at least one filter cartridge is arranged, and
   an end piece, the end piece having an axial end face facing the filter cartridge,
   the filter cartridge comprising:
      a cylindrical filter element made from filter material, the filter element having an inner side, with the filter material being designed for being cleaned when a compressed air flow is applied against a flow direction of the dirty gas flow,
      a filter insert inserted in the filter element, the filter element having an outer side,
      a base body having a first axial end face, a second axial end face opposed to the first axial end face and a surface designed for guiding the compressed air flow, the surface having an outer diameter increasing from the first axial end face to the second axial end face, the base body being completely axially arranged within the filter element, the second axial end face of the base body being attached to the filter insert, and an inner space being formed radially between the inner side of the filter element, the outer side of the filter insert and the surface of the base body, the base body, in conjunction with the end piece, forming a flow guiding device being configured to widen and to guide the compressed air flow into the inner space and to the inner side of the filter element, the base body having a distal end zone which is prepared for being completed by the end piece for flow guiding the compressed air flow, the end piece being separate from the filter cartridge and secured to the housing, the axial end face of the end piece being disposed to face the first axial end face of the base body.

2. The filter unit according to claim 1, wherein the surface of the base body is formed and disposed so that it is transformed seamlessly and/or infinitely and/or in conformity with the slope and/or in conformity with the curvature into an outer surface of the end piece.

3. The filter unit according to claim 2, wherein the transition of the surface of the base body into the outer surface of the end piece is such that the flow of the compressed air flow during cleaning is adjacent to a total surface of the base body and of the end piece so as to reach at least 80% of the filter material in the case of cleaning.

4. The filter unit according to claim 1, wherein electrically conducting elements are provided in the base body for grounding, said elements being designed so that the filter cartridge is grounded with respect to a housing.

5. The filter unit according to claim 4, wherein the electrically conducting elements are in the form of resilient contact electrodes.

6. The filter unit according to claim 1, wherein the base body includes a receiver or a transmitter comprising RFID technology for checking a mating filter cartridge and/or for checking positioning of the filter cartridge.

7. The filter unit according to claim 1, wherein the filter insert is made from the filter material.

* * * * *